(12) United States Patent
Kim et al.

(10) Patent No.: US 8,407,329 B2
(45) Date of Patent: Mar. 26, 2013

(54) REPORTING INFORMATION TO A NETWORK

(75) Inventors: Te-Hyun Kim, Gyeonggi-Do (KR); Pablo Hernandez, Paris (FR)

(73) Assignee: LG Electronics Inc., Seoul (KR)

( * ) Notice: Subject to any disclaimer, the term of this patent is extended or adjusted under 35 U.S.C. 154(b) by 1082 days.

(21) Appl. No.: 11/657,094

(22) Filed: Jan. 24, 2007

(65) Prior Publication Data

US 2007/0174462 A1 Jul. 26, 2007

Related U.S. Application Data

(60) Provisional application No. 60/761,793, filed on Jan. 25, 2006, provisional application No. 60/762,517, filed on Jan. 27, 2006.

(30) Foreign Application Priority Data

May 12, 2006 (KR) .................... 10-2006-0043153
Jan. 18, 2007 (KR) .................... 10-2007-0005819

(51) Int. Cl.
*G06F 15/173* (2006.01)
*G06F 15/16* (2006.01)
(52) U.S. Cl. .................. 709/223; 709/229; 709/206
(58) Field of Classification Search .................. 709/223
See application file for complete search history.

(56) References Cited

U.S. PATENT DOCUMENTS

| 5,757,925 | A | | 5/1998 | Faybishenko | |
|---|---|---|---|---|---|
| 6,012,151 | A | * | 1/2000 | Mano | 714/11 |
| 6,263,358 | B1 | * | 7/2001 | Lee et al. | 718/100 |
| 6,330,586 | B1 | | 12/2001 | Yates et al. | |
| 6,353,433 | B1 | * | 3/2002 | Schumer | 345/173 |
| 6,493,755 | B1 | | 12/2002 | Hansen et al. | |
| 6,928,646 | B1 | * | 8/2005 | James et al. | 718/104 |
| 7,290,070 | B2 | * | 10/2007 | Brice et al. | 710/37 |
| 7,325,036 | B2 | * | 1/2008 | Simyon et al. | 709/206 |
| 2003/0002525 | A1 | * | 1/2003 | Grilli et al. | 370/465 |
| 2006/0007932 | A1 | * | 1/2006 | Simyon | 370/392 |
| 2006/0015626 | A1 | * | 1/2006 | Hallamaa et al. | 709/229 |

FOREIGN PATENT DOCUMENTS

WO WO-2005/069664 A1 7/2005

* cited by examiner

*Primary Examiner* — Mohamed Ibrahim
*Assistant Examiner* — Joiya M Cloud
(74) *Attorney, Agent, or Firm* — Birch, Stewart, Kolasch & Birch, LLP

(57) ABSTRACT

For achieving device management, the terminal may select certain command execution results and transmit such to the network instead of always sending all command execution results. Accordingly, resources of the terminal and radio communication resources can be more efficiently utilized when compared to previously used device management procedures. Furthermore, since a record that is relevant to operations performed within the terminal is saved, even if a certain result of executing a particular command is not successfully transmitted to the network due to an error, the network may still be able to verify the command execution result by accessing the record that was stored in the terminal.

11 Claims, 11 Drawing Sheets

FIG. 3

```
<Gating>
   <StatusGating>
      <Ref>5</Ref>
      <Code>200~299</Code>
   </StatusGating>
</Gating>
```

FIG. 4

```
<Status>
    <MsgRef>1</MsgRef>
    <CmdID>1</CmdID>
    <CmdRef>5</CmdRef>
    <Cmd>Alert</Cmd>
    <Data>200</Data><--OK -->
</Status>
```

FIG. 6

```
Commands {
    <Replace>
        <CmdID>1</CmdID>
        <CmdRef>1</CmdRef>
        <Item> ... </Item>
        <Sched> ......</Sched>
    </Replace>
    <Replace>
        <CmdID>1</CmdID>
        <CmdRef>2</CmdRef>
        <Item>...</Item>
        <Sched> ......</Sched>
    </Replace>
    <Get>
        <CmdID>2</CmdID>
        <CmdRef>3</CmdRef>
        <Item>...</Item>
        <Sched> ......</Sched>
    </Get>
    <Exec>
        <CmdID>3</CmdID>
        <CmdRef>4</CmdRef>
        <Item>...</Item>
        <Sched> ......</Sched>
    </Get>
}
Gating {
    <StatusGating>
        <Ref>1</Ref>
        <Code>200</Code>
    </StatusGating>
    <StatusGating>
        <Ref>2</Ref>
        <Code>200</Code>
    </StatusGating>
    <StatusGating>
        <Ref>3</Ref>
        <Code>200</Code>
    </StatusGating>
    <AlertGating>
        <Ref>?</Ref>
        <Corr>abc1234</Corr>
        <Code>1226</Code>
    </AlertGating>
}
```

FIG. 7

(a)
```
<Status>
    <MsgRef>1</MsgRef>
    <CmdID>1</CmdID>
    <CmdRef>1</CmdRef>
    <Cmd>Replace</Cmd>
    <Data>200</Data><!--OK -->
</Status>
```

(b)
```
<Status>
    <MsgRef>2</MsgRef>
    <CmdID>1</CmdID>
    <CmdRef>2</CmdRef>
    <Cmd>Replace</Cmd>
    <Data>400</Data>
</Status>
```

(c)
```
<Status>
    <MsgRef>3</MsgRef>
    <CmdID>2</CmdID>
    <CmdRef>3</CmdRef>
    <Cmd>Get</Cmd>
    <Data>200</Data>
</Status>
<Result>
    <MsgRef>4</MsgRef>
    <CmdID>2</CmdID>
    <CmdRef>3</CmdID>
    <Item>...</Item>
<Result>
```

(d)
```
<Status>
    <MsgRef>5</MsgRef>
    <CmdID>3</CmdID>
    <CmdRef>4</CmdRef>
    <Cmd>Exec</Cmd>
    <Data>200</Data>
</Status>
<Alert>
    <CmdRef>?</CmdRef>
    <CmdID>3</CmdID>
    <Correlator>abc1234</Correlator>
    <Data>1226</Data>
    <Item>...</Item>
</Alert>
```

FIG. 8

```
Status Reporting }
    <Status>
        <MsgRef>1</MsgRef>
        <CmdRef>2/CmdRef>
        <Cmd>Replace</Cmd>
        <Data>400</Data>
    </Status>
    <Status>
        <MsgRef>1</MsgRef>
        <CmdRef>3/CmdRef>
        <Cmd>Get</Cmd>
        <Data>200</Data>
    </Status>
    <Result>
        <MsgRef>1</MsgRef>
        <CmdRef>3/CmdRef>
        <Item>...</Item>
    </Result>
    <Status>
        <MsgRef>4</MsgRef>
        <CmdRef>4</CmdRef>
        <Cmd>Exec</Cmd>
        <Data>200</Data>
    </Status>
}
```

REPORTING INFORMATION TO A NETWORK

This Non-provisional application claims priority under 35 U.S.C. §119(e) on U.S. Provisional Application Nos. 60/761,793 and 60/762,517 filed on Jan. 25, 2006 and Jan. 27, 2006, respectively and under 35 U.S.C. §119(a) on Patent Application No(s). 10-2006-0043153 and 10-2007-0005819 filed in Republic of Korea on May 12, 2006 and Jan. 18, 2007, respectively, the entire contents of which are hereby incorporated by reference.

This disclosure relates to reporting information to a network.

A device management technique allows a network (that may include a server) to manage a user device (i.e., terminal). The resources of the terminal can be represented as objects in a logical hierarchy structure that can be recognized by the server and accessed via device management commands to perform management of the terminal.

The present inventors recognized some drawbacks in certain device management techniques. Namely, device management commands may be executed according to a pre-set schedule, and the results thereof are always reported back to the server. But in some situations, doing so causes unnecessary consumption of resources of the terminal and wastes radio communication resources.

FIG. 3 shows an exemplary gating rule according to embodiments herein.

FIG. 4 shows exemplary results from executing a command for device management according to one or more embodiments herein.

FIG. 6 shows an exemplary scheduling context transmitted to the terminal of FIG. 1.

FIG. 7 shows the results from executing a command for device management of FIG. 6.

FIG. 8 shows an exemplary status report transmitted by the terminal of FIG. 1.

Figure 1:
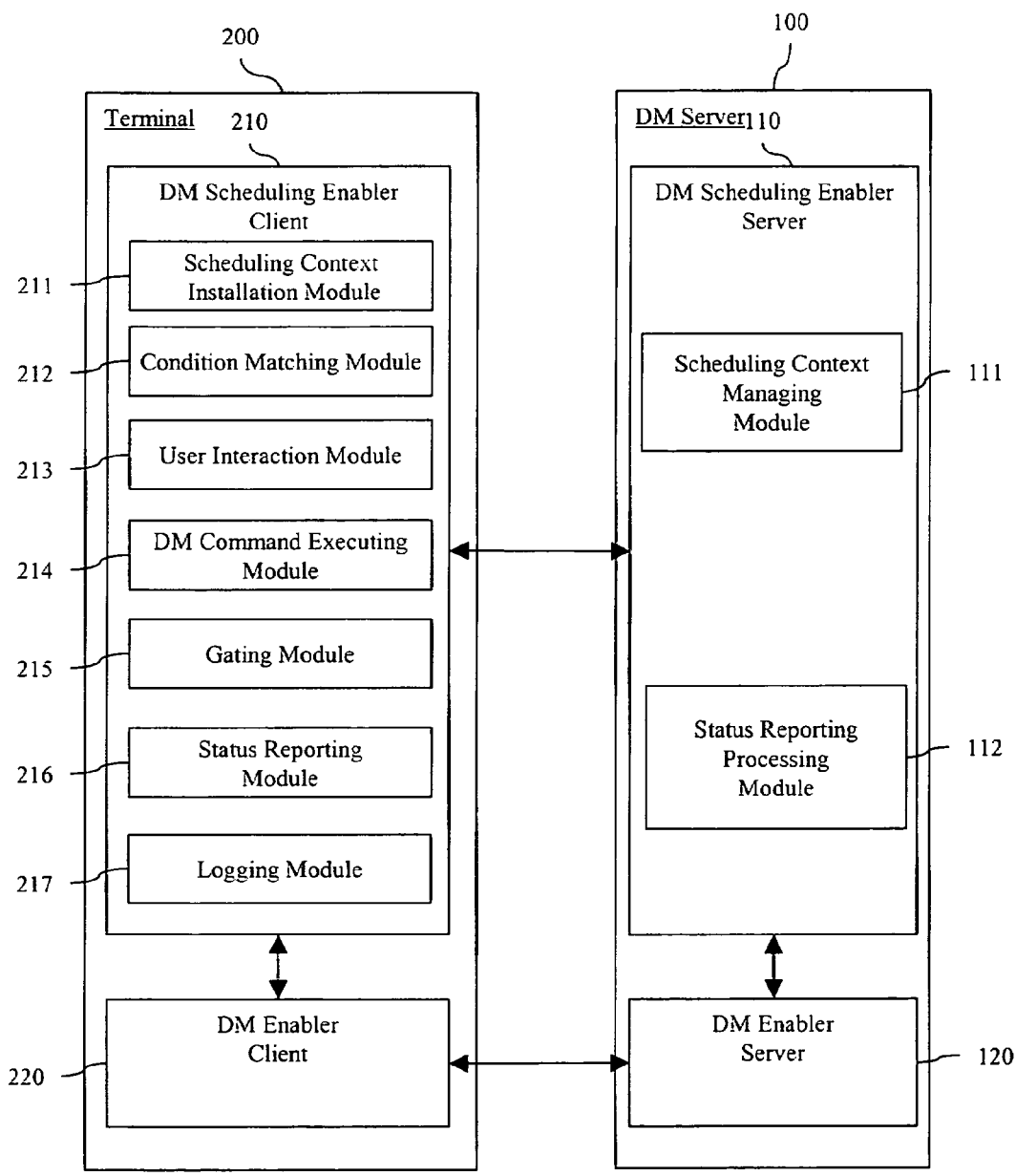
FIG. 1 shows an exemplary server and an exemplary terminal according to one or more embodiments herein.

FIG. 1 shows the exemplary server as being a device management is (DM) server 100 and the exemplary terminal as being a terminal 200. It can be understood that other types of servers, network entities, or the like may be implemented. The terminal may be a user device, user equipment (UE), a mobile terminal, a client device, or the like.

An exemplary DM server 100, an exemplary terminal 200, and the overall operation according to various exemplary embodiments will be described under separate sections labeled with appropriate sub-headings.

DM Server 100

The DM server 100 may comprise a DM scheduling enabler server 110, and a DM enabler server 120. It can be understood that additional and/or alternative entities and elements may exist within the DM server 100.

The DM scheduling enabler server 110 may comprise a scheduling context management module 111, and a status reporting processing module 112. It can be understood that additional and/or alternative entities and elements may exist within the DM scheduling enabler server 110.

The scheduling context management module 111 is an entity (comprised of hardware, software or a combination thereof) that can create a scheduling context (i.e., an outline, basis, etc. used in performing device management scheduling) including commands (or instructions) to be executed in the terminal 200 and various conditions (or circumstances) to execute the command, and can transmit the created scheduling context to the terminal 200. The scheduling context management module 111 may transmit to the terminal 200, particular instructions, such as a gating rule, that is included in the scheduling context. Here, the gating rule may be used to determine whether a result from executing a command should be reported to the server or not reported (i.e., whether the result should be gated-off). The gating rule will be explained with reference to FIG. 3.

The scheduling context management module 111 may transmit to the terminal 200, an event reporting rule that is included in the scheduling context. Here, the event reporting rule may specify whether a status of the scheduling context should be reported to the server. The event reporting rule will be explained with reference to FIG. 2. Also, the scheduling context management module 111 may transmit to the terminal 200, a logging rule that is included in the scheduling context. Here, the logging rule may specify whether the terminal should log (i.e., record) an operation(s) relevant to the scheduling context and to specify a storage (or recording) position of the data to be logged. The logging rule will be explained with reference to FIG. 2.

The status reporting processing module 112 is an entity (comprised of hardware, software or a combination thereof) that may receive a result from executing a command or a status report from the terminal 200, and then to perform parsing thereon. Then, the status reporting processing module 112 certifies (i.e., authenticates, checks, etc.) the kind (or type) of the result or status report, and routes the result or status report to the scheduling context management module 111 for managing the certified scheduling context. However, when the result or status report received from the terminal 200 is not directly processed, that is, when it is dedicated to a different server, the status reporting processing module 112 may route the result or the status report the different server.

The DM enabler 120 is an entity (comprised of hardware, software or a combination thereof) that may request performing of general device management and to receive a result thereof. Here, general device management may refer to a device management procedure that has not been scheduled from the terminal 200.

Terminal 200

The terminal 200 may comprise a DM enabler client 220, and a DM scheduling enabler client 210. It can be understood that additional and/or alternative entities and elements may exist within the terminal 200.

The DM scheduling enabler client 210 may include a scheduling context installation module 211, a condition matching module 212, a DM command execution module 214, a gating module 215, a status reporting module 216, and a logging module 217. It can be understood that additional and/or alternative entities and elements may exist within the DM scheduling enabler client 210.

The scheduling context installation module 211 is an entity (comprised of hardware, software or a combination thereof) that may receive an installation request of the scheduling context from the DM server 100, and to process it. Namely, the scheduling context installation module 211 may set at least one of following factors (i.e., features, items, etc.) in the terminal 200 in the form of a particular logical hierarchy structure (i.e., a device management tree): a command for a device management, a condition to execute the command for device management, the gating rule, the event reporting rule, and the logging rule. It can be understood that additional and/or alternative factors may also be set.

Figure 2:
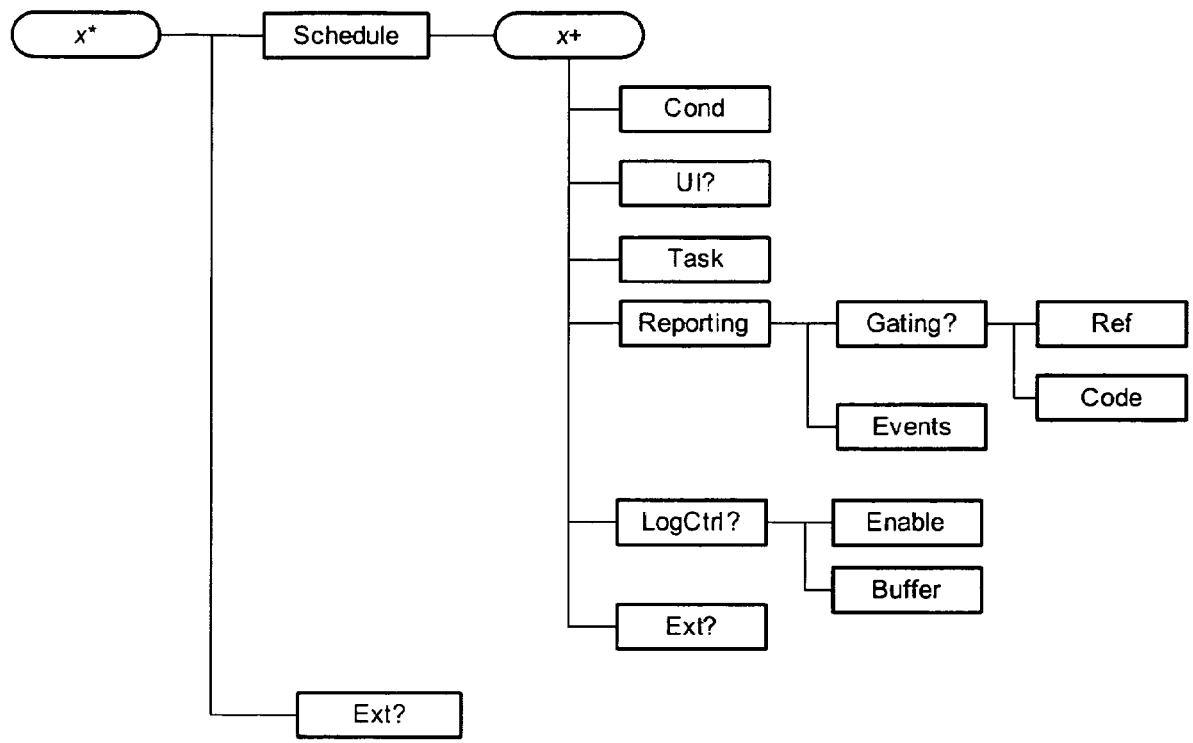
FIG. 2 shows an exemplary logical management structure for a scheduling context according to one or more embodiments herein.

The scheduling context set in the terminal 200 will be explained with reference to FIG. 2. The scheduling context may include at least one of the following: a Task node to specify the command for a DM, a Condition node to specify the condition to execute the command for a DM, a UI (User Interaction) node to specify an interaction with a user, a Gating node corresponding to the gating rule, and a LogCtrl (Log Control) node corresponding to the logging rule. It can be understood that additional and/or alternative types of nodes (i.e., placeholders, points, etc.) may also be implemented.

The Gating node may include an Ref node to specify a reference number of the command to be gated-off, and a Code node to specify a response code to be gated-off. The LogCtrl node may include an Enable node to enable or disable a logging (or recording) procedure, and a Buffer node to specify a buffer for storing a generated log (or record).

The condition matching module 212 is an entity (comprised of hardware, software or a combination thereof) that may monitor whether a particular condition(s) (i.e., reason, circumstance, etc.) to execute a command is satisfied or not.

The user interaction module 213 is an entity (comprised of hardware, software or a combination thereof) that may execute (or perform) an interaction with the user for the command execution when a particular condition is satisfied.

If the condition matching module 212 determines that the condition to execute the command is satisfied, the DM command execution module 214 then proceeds to execute the command for device management by cooperating with the DM enabler client 220.

The gating module 215 is an entity (comprised of hardware, software or a combination thereof) that may determine whether a result from executing the command should be reported to the DM server 100. As aforementioned, when the DM server 100 includes a gating rule in the scheduling context, the gating module 215 can determine whether a result from executing the command should be reported to the DM server 100 based on the gating rule. The gating module 215 may determine whether a result from executing the command should be reported to the DM server 100 by generating a gating rule.

The status reporting module 216 may report to the server 100, the result that was determined to be reported by the gating module 215. The gating module 215 may further report at least one of the following factors: a status of the terminal 200, a status of the scheduling context, an event which occurred in the terminal 200, and an error which has been occurred in the terminal 200 to the DM server 100. It can be understood that additional and/or alternative types of factors may also be used.

In more detail, the status reporting module 216 may write (or create) a report message (or some other type of indication used for reporting) by using a result from executing the command or using the status, and such is transmitted to the DM server 100. The report message may be transmitted to the DM server 100 by using a Generic Alert Message (or some other type of indication message or signaling procedure).

The logging module 217 is an entity (comprised of hardware, software or a combination thereof) that may store a log (or record) that is relevant to an operation for device management scheduling. The logging module 217 may store a log (or record) that is relevant to a specific operation by using the logging rule (or some other type of instruction) included in the scheduling context. For instance, the logging module 217 may store a log (or record) whenever a condition to execute the command for device management is found to be satisfied (or matched), or when the command for device management is executed, or when a result from executing the command for device management is reported to the server. It can be understood that such logs (or records) may be stored in other additional and/or alternative situations.

The log(s) or record(s) stored by the logging module 217 may be accessed by the DM server 100 as necessary. Doing so can minimize the situations where the DM server 100 incorrectly determines that the terminal 200 is in a normal state, because the status reporting module 216 had abnormally reported a status of the terminal 100 due to an unexpected error or some other type of malfunction.

Figure 5:
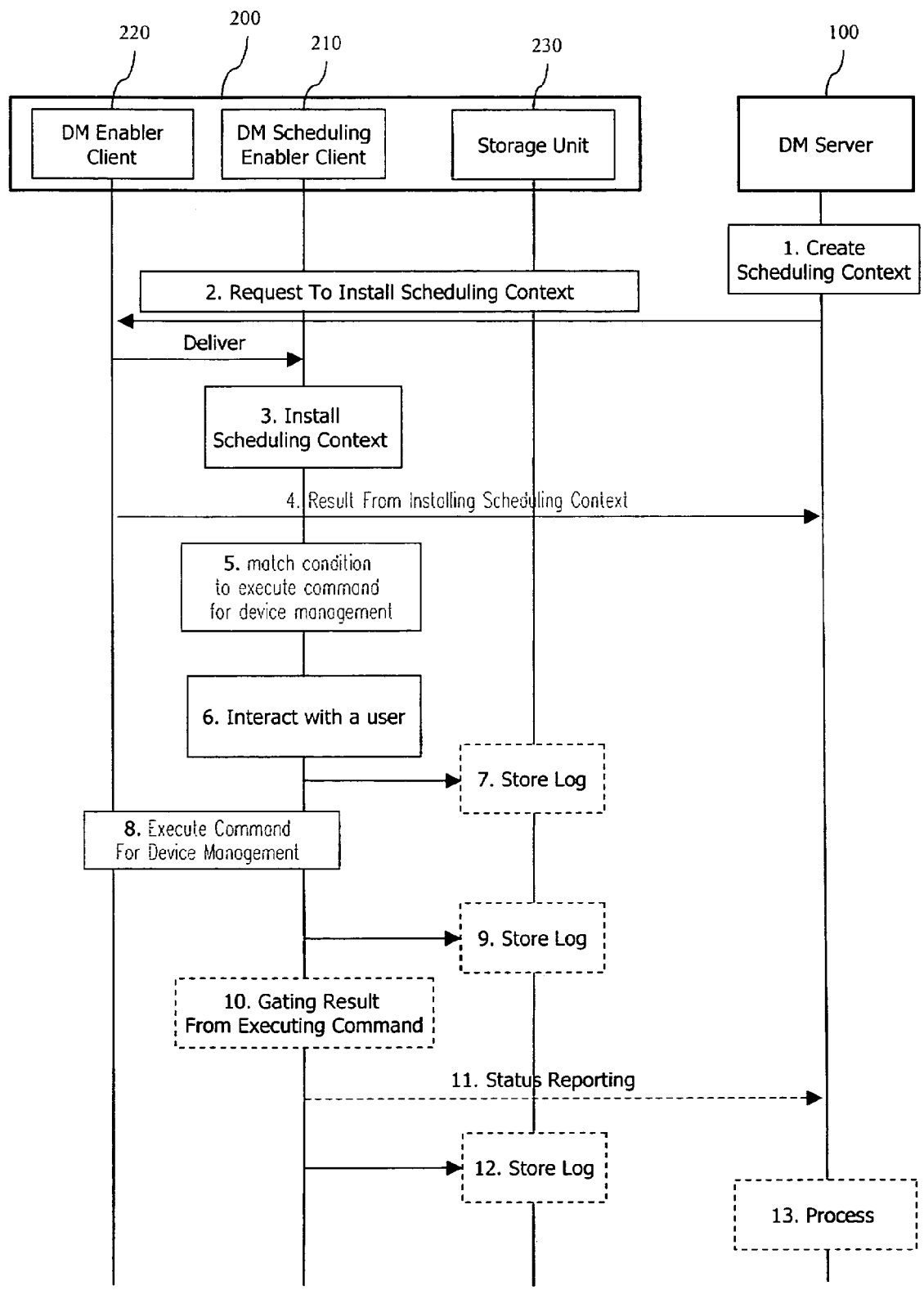
FIG. 5 shows a flowchart of an exemplary operation of the server and the terminal of FIG. 1.

The logging module 217 can manage the storage unit 230 (or some other memory means) of FIG. 5 that exists within the terminal 200 by referring to the logging rule included in the scheduling context. For instance, the logging module 217 may adjust an allocation size of the storage unit 230, or may selectively use a method for storing a log (or record) in the storage unit 230, such as a circular buffer method, a linear buffer method or the like. The logging module 217 may determine a position (or location) of a log (or record) relevant to a specific operation in the storage unit 230, or may abolish one or more relatively old log(s) or one or more relatively recent log(s) when there is insufficient storage space in the storage unit 230. The logging module 217 may be included in the DM scheduling enabler client 220, or may be provided as a separate entity. It can be understood that the logging module 217 may be implemented in many other ways.

The DM enabler client 220 is an entity (comprised of hardware, software or a combination thereof) that may execute a command(s) for device management by cooperating with the command execution module 214. For example, the DM enabler client 220 may receive a command (or instruction) for device management from the command execution module 214, and transmits (or informs) to the command execution module 214 about the result(s) from executing the command.

Thus far, various concepts related to performing device management was explained with respect to some exemplary embodiments. In more detail, a DM server 100 may comprise a DM scheduling enabler server 110 and a DM enabler server 120. The terminal 200 may comprise a DM scheduling enabler client that may include a scheduling context installation module 211, a condition matching module 212, a user Interaction module 213, a DM command execution module 214, a gating module 215, a status reporting module 216, and a logging module 217; and a DM enabler client 220. However, it is clear that various additional and/or alternative entities, elements, and the like may also be implemented.

An exemplary device management (DM) system may be implemented by a combination of a processor or other type of control means, a network interface or other type of connection means, and a storage unit or other type of memory means.

Hereinafter, the gating rule and exemplary operation procedures of the gating module will be explained in more detail with reference to FIGS. 3 and 4.

Referring to FIG. 3, the gating rule may include at least one of a first element, a second element, and a third element. It is clear that other additional and/or alternative elements are possible.

The first element may specify a type of a result from executing a command for device management. That is, the first element may specify the result from executing the command, such as a Status, a Result, an Alert or the like. The first element may be composed of a StatusGating element, or a ResultGating element, or an AlertGating element as shown in FIG. 3. It is clear that the first element may specify other additional and/or alternative types of factors and may be composed of other additional and/or alternative types of elements.

When the result from executing the command refers to Status, the second element may specify a reference number of a command for device management (see Ref in FIG. 3). That is, when there are multiple commands used for device management, the second element may specify a specific command for device management among the multiple commands. However, when the result from executing the command refers to Alert, the second element may specify a parameter of the command Exec (see Corr in FIG. 3). The parameter denotes a cause (or reason) as to why the Alert has occurred, through which the second element can specify a condition of the Alert according to each cause.

The third element may specify a response code corresponding to a result from executing the command for device management (see Code in FIG. 3).

The first, second, and third elements will be explained in more detail with reference to the gating rule of FIG. 3. The gating rule may specify a result from executing the command having a Status element since the first element is composed of a StatusGating element, and may specify a command having a reference number of 5 since the second element is composed of a Ref element. Also, the gating rule may specify a result from executing the command having a code of 200~299, since the third element is composed of a Code element. In summary, when a result from executing a command has a Status element, the command has a reference number of 5, and a code of the result from executing the command is 200~299, and the gating rule need not be used to report the corresponding result. On the contrary, when a result from executing a command has a Status element, the command has a reference number of 5, and a code of the result from executing the command is 200~299, the gating rule may be used to report a corresponding result from executing the command.

The first to third elements should not be used simultaneously in some situations. That is, only the first element and the second element may be used, or only the second element and the third element may be used. The second and third elements are dependent on the first element in FIG. 3. However, the first to third elements may be independent from one another.

Referring to FIG. 4, the result from executing the command may comprise a first field, a second field, and a third field. It is clear that other additional and/or alternative field (or other items) may also be implemented.

The first field may specify a type of a result from executing a command, and may include one of a Status, a Result, an Alert, and the like. The Status is a result from executing a command such as Replace, Exec, Get, Add, Delete, and Copy (or other additional and/or alternative factors). Also, the Result is a result from executing the Get command, which is generated together with the Status. Also, the Alert is a result from executing the Exec command, which is generated together with the Status, and may be referred to as a Generic Alert.

When the first field is Status, the second field may be a CmdRef field which represents a reference number of the command as shown in FIG. 4. The CmdRef may correspond to the Ref in the gating rule. However, when the first field is an Alert, the second field may be a Correlator that represents a parameter of the Exec. The Corrector may correspond to the Corr in the gating rule. The third field may be a Data representing a code of a result from executing the command as shown in FIG. 4.

The first to third fields will be explained in more detail with reference to FIG. 4. The first field of Status represents that a result from executing a command has a Status type. The second field of CmdRef represents a result from executing a command having a reference number of 5, and the third field of Data 200 represents that the command has been normally executed. In summary, FIG. 4 shows that the result from executing a command has a Status type, and the command having a reference number of 5 has been normally executed. Herein, the MsgRef is a field to identify each result from executing a command when one or more commands exist. The CmdID represents a type of a command (will be called as a fourth field). In more detail, the CmdID represents a type of command, such as Replace, Exec, Get, Add, Delete, and Copy (but other additional and/or alternative types are also possible).

The gating module 215 may determine whether a result from executing a command should be reported based on the gating rule of FIG. 3. The gating rule of FIG. 3 may be set such that a report is not received when the result from executing a command has a Status type (first element), the command has a reference number of 5 (second element), and the result from executing a command has a code of 200~299 (third element). Since the result from executing a command shown in FIG. 4 corresponds to the gating rule, the gating module 215 may determine that the result from executing a command should not be reported to the DM server 100.

An exemplary operation for determining whether to report a result from executing a command by the terminal 200, and an exemplary operation for executing a logging procedure will be explained in more detail with reference to FIG. 5, which only shows the DM server 100 and the terminal 200 for the sake of simplicity. It should be noted that each operation may be implemented by various components in the DM server 100 and the terminal 200.

Operation

The exemplary operation procedures will be explained with reference to FIGS. 5 through 8.

1) Referring to FIG. 5, the DM server 100 creates a scheduling context including a command and a condition to execute the command. The DM server 100 may include a gating rule in the scheduling context.

The scheduling context may be implemented as shown in FIG. 6. The scheduling context may comprise a Command item to represent the command, and a Gating item to represent the gating rule. However, it should be noted that the scheduling context shown in FIG. 6 is merely a non-limiting example.

Referring to FIG. 6, the Command item may comprise two Replace elements, one Get element, and one Exec element. Each of these command elements may be composed of a CmdRef, a CmdId, an Item, and a Sched. The CmdRef represents a reference number of a command, which is used to identify each command when a plurality of commands exist. The CmdID represents a type of command. The Sched represents a condition to execute the command.

The Gating item of FIG. 6 may include four gating rules, and each of the gating rules may include at least one of a first element, a second element, and a third element. It is clear that other additional and/or alternative elements are possible.

2) The DM server 100 establishes a session with the terminal 200, and transmits the created scheduling context to the DM scheduling enabler client 210 of the terminal 200 by using a DM protocol. The DM server 100 may transmit the created scheduling context to the DM enabler client 220 of the terminal 200. Then, the DM enabler client 220 transmits the created scheduling context to the DM scheduling enabler client 210.

3) The DM scheduling enabler client 210 (namely, the scheduling context installation module 211) of the terminal 200 sets a command and a condition to execute the command by using the received DM scheduling context. The gating rule is set in the terminal 200.

4) When the setting is completed, the DM scheduling enabler client 210 reports a result of installing the DM scheduling context to the DM server 100. The DM scheduling enabler client 210 may report the result of installing the DM scheduling context to the DM server 100 via the DM enabler client 220.

5) The DM scheduling enabler client 210 (namely, the condition matching module 212) monitors whether a condition to execute the command is satisfied.

6) If the DM scheduling enabler client 210 finds that the condition to execute the command is satisfied, the user interaction module 213 interacts with the user.

7) The DM scheduling enabler client 210 (namely, the logging module 217) stores a log (or record) relevant to the condition matching in a storage unit 230. That is, the DM scheduling enabler client 210 performs a logging procedure with regard to the condition matching and the interaction with the user.

8) The DM scheduling enabler client 210 (namely, the DM command execution module 214) executes the command by cooperating with the DM enabler client 220. The command may be one of a Replace, a Get, and an Exec that is included in the scheduling context of FIG. 6.

9) When the command is executed by the DM scheduling enabler client 210, or when the command is not executed due to an error (or due to some other reason), the DM scheduling enabler client 210 (namely, the logging module 217) stores a log (or record) relevant to the command execution in the storage unit 230.

10) When the execution for the command is completed, the DM scheduling enabler client 210 (namely, the gating module 215) determines whether a result from executing the command should be reported to the DM server 100. The determination may be performed based on the gating rule existing within the scheduling context.

In order to further explain the above-described aspect of determining whether the result should be reported, if the result of executing the command (of FIG. 6) is as shown in FIG. 7, then the gating rule of FIG. 6 is assumed to be applicable.

In FIG. 6, there are four gating rules are included. A first gating rule is not to report the result of executing a command when the result from executing a command has a Status type, the command has a reference number of 1, and a code of the result from executing the command is 200. Referring to the result of executing the first command Replace (of FIG. 6) that is shown in FIG. 7A, the first field is a Status, the second field CmdRef is 1, and the third field Data is 200. Accordingly, the first to third fields are respectively matched with the first to third elements, and thereby the result is not to be reported to the DM server 100.

A second gating rule is not to report the result of executing a command when the result from executing a command has a Status type, the command has a reference number of 2, and a code of the result from executing the command is 200. When the result from executing the second command Replace (of FIG. 6) is as shown in FIG. 7B, the first field is a Status, the second field CmdRef is 2, and the third field Data is 400. Since the third field is not matched with the third element, the result is to be reported to the DM server 100.

A third gating rule is not to report the result of executing a command when the result from executing a command has a Status type and a command having a reference number of 3 has a code of 200. Referring to the result from executing the third command Get (of FIG. 6) as shown in FIG. 7C, there are two types of results of execution: the first field may be Status or Result. If the first field is Status, there is a match with the second and third elements of the third gating rule. Accordingly, the result is not reported to the DM server 100. On the contrary, if the first field is Result, there are no matches with any elements of the third gating rule. Accordingly, the result is not reported to the DM server 100.

Finally, a fourth gating rule is not to report the result of executing a command when the result from executing a command has an Alert type, a command Exec has a parameter of abc1234, and a response code is 1226, because the first element is Alert, the second element Corr is abc1234, and the third element Code is 1226. Referring to the result from executing the fourth command Exec (of FIG. 6) as shown in FIG. 7D, the first field is Status or Alert. As the Status is not specified in the gating rule, its execution result is to be reported to the DM server 100. On the contrary, since the execution result has a first field of Alert, as the second field Correlator is abc1234 and the third field Data is 1226, the first to third elements are all satisfied and thus the result is not to be reported to the DM server 100.

In the four exemplary gating rules above, it is described that when the result of executing a command matches the first to third elements, the result is not to be reported to the DM server 100. On the contrary, then the corresponding execution result may be reported to the DM server 100 for only the situation where there is a match for all the first to third elements.

11) The DM scheduling enabler client 210 (namely, the status reporting module 216) selectively transmits a status report to the DM server 100 based on the determination. In case there is more than one command, when all of the commands are executed, all the results of executing the commands are included in a single message that may be transmitted to the DM server 100.

A result of executing the command and the gating rule of FIG. 6 are shown in FIG. 7, and the result is reported in the manner shown in FIG. 8. The result may include a Status from executing a Replace command having a CmdRef of 2, may include a Status and a Result from executing a Get command having a CmdRef of 3, and may include a Status from executing a Exec command having a CmdRef of 4.

12) When the status report is transmitted by the DM scheduling enabler client 210, or when the status report is not transmitted due to an error (or some other reason), the DM scheduling enabler client 210 (namely, the logging module 217) stores a log (or record) relevant to the status report in the storage unit 230.

13) The DM server 100 receives the status report and processes it.

Thus far, the operation of the system of FIG. 1 was explained with reference to FIGS. 5 to 8. Hereinafter, an exemplary method for reporting information to a server and an exemplary logging method will be explained with reference to FIGS. 9 to 11.

Figure 9:
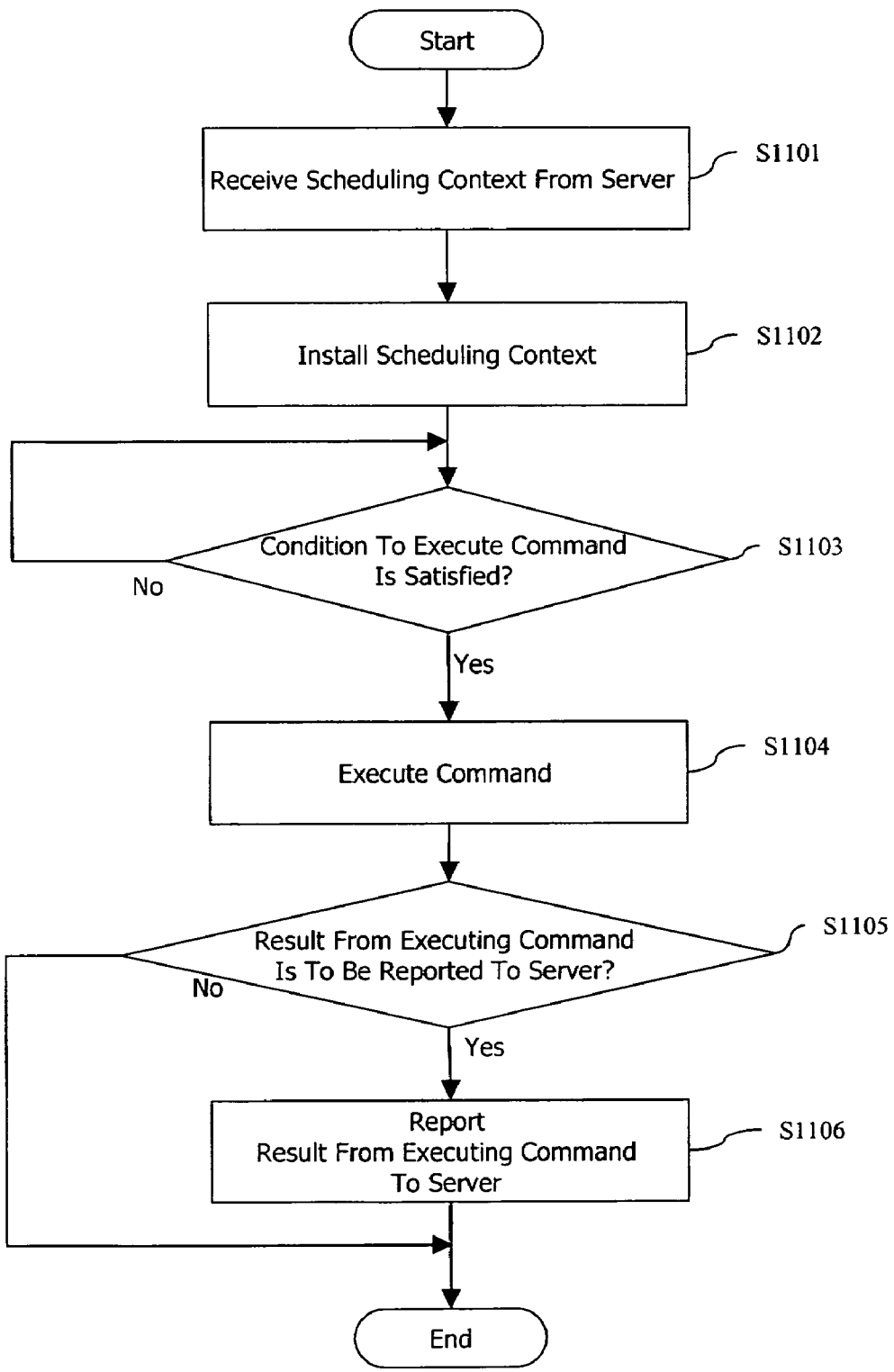
FIG. 9 shows a flowchart of an exemplary method of reporting information to a server according to one or more embodiments herein.

As shown in FIG. 9, by determining whether the result of executing a command should be reported to the DM server 100, only certain necessary results are reported to the DM server 100, which thereby minimizes the waste of wireless (radio) resources.

Namely, the terminal 200 may receive, from the DM server 100, a scheduling context including a command(s) and a condition(s) to execute the command (S1101). A gating rule may be further included in the received scheduling context. The scheduling context may be implemented as shown in FIG. 6.

The terminal 200 may install (or otherwise set up) the received scheduling context (S1102). That is, the terminal 200 may set a command(s) and a condition(s) to execute the command in the terminal 200 by using the scheduling context. A gating rule (or some other indication that certain command execution results need not be reported back to the server) may be also set in the terminal 200.

When installation is complete, the terminal 200 monitors whether a condition to execute the command is satisfied (S1103).

If it is found that such condition is satisfied, the terminal 200 then proceeds to execute the command (S1104).

When the command is completely executed (S1104), the terminal 200 determines whether to report the result of executing the command to the server (S1105). As aforementioned, the determination may be performed by using the gating rule included in the scheduling context. The result of executing the command may be implemented as shown in FIG. 7. However, it is clear that other implementations and variations would also be possible.

If it is determined that the result of executing the command is to be reported to the server 100 (S1105), the terminal 200 then transmits the result of executing the command to the server (S1106). The result of executing the command may be implemented as shown in FIG. 8. However, it is clear that other implementations and variations would also be possible.

Figure 10:
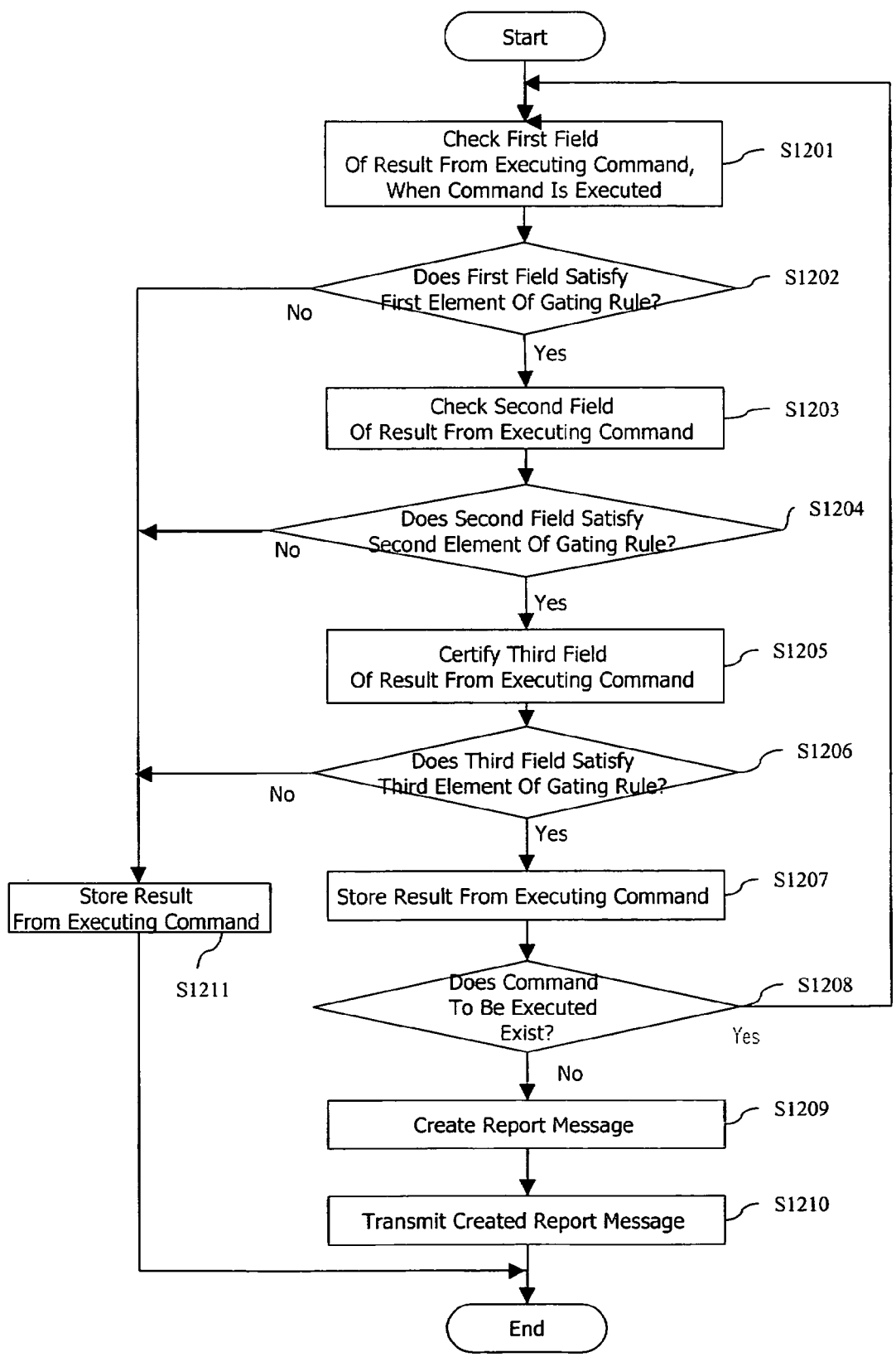
FIG. 10 shows an exemplary method of reporting information to a server of FIG. 9.

An exemplary process for determining whether a status report is to be executed or not based on the gating rule will be explained with reference to FIG. 10.

When the command is executed according to the condition matching (i.e., when a certain condition(s) is satisfied), a first field of the result of executing the command is certified (or authenticated, authorized, checked, etc.) (S1201). The first field may indicate a Status, a Result, or an Alert. Here, it is clear that other types of indications may be in the first field.

Then, it is checked whether the certified first field satisfies the first element of the gating rule (S1202). However, the first element need not be included in the gating rule. In such case, the terminal 200 can execute the certification procedure (S1202) by itself (i.e., without referring to a gating rule included in the scheduling context received from the DM server 100). If it is determined that the result of executing the command is not to be reported, the result may be stored (S1211). The stored result of executing the command may be later deleted by the terminal 200.

Then, a second field of the result from executing the command is certified (or authenticated, authorized, checked, etc.) (S1203). Herein, the second field may be a CmdRef representing a reference number of a command. The second field may be a Correlator when the first field is an Alert. Then, it is checked whether the certified second field satisfies the second element of the gating rule (S1204). The second element may be an Ref. When the first element is related to an Alert, the second element may be a Corr. If the second field does not satisfy the second element of the gating rule (S1204), the result of executing the command may be stored (S1211).

Then, a third field of the result of executing the command is certified (or authenticated, authorized, checked, etc.) (S1205). Herein, the third field may be a Data representing a code of the result of executing the command. Then, it is checked whether the certified third field satisfies the third element of the gating rule (S1206). The third element may be a Code representing a code of the result of executing the command. If the third field does not satisfy the third element (S1206), the result from executing the command may be stored (S1211).

If it is finally determined that the result of executing the command is to be reported to the DM serer 100 (as a result of performing all of the certification procedures S1202, S1204, and S1206), the result of executing the command may be stored (S1207). If multiple commands exist, the storage procedure S1207 is performed so as to execute all of commands and then to report the results of executing such commands to the DM server 100 at one time.

Then, it is checked whether a command to be executed exists (S1208). If so, the procedure returns back to step S1201.

However, if it is found that a command to be executed does not exist (S1208), a report message for this the result is created (S1209). Herein, an exemplary written report message is shown in FIG. 8.

Then, the terminal 200 may transmit the created report message to the DM server 100 (S1210).

Figure 11:
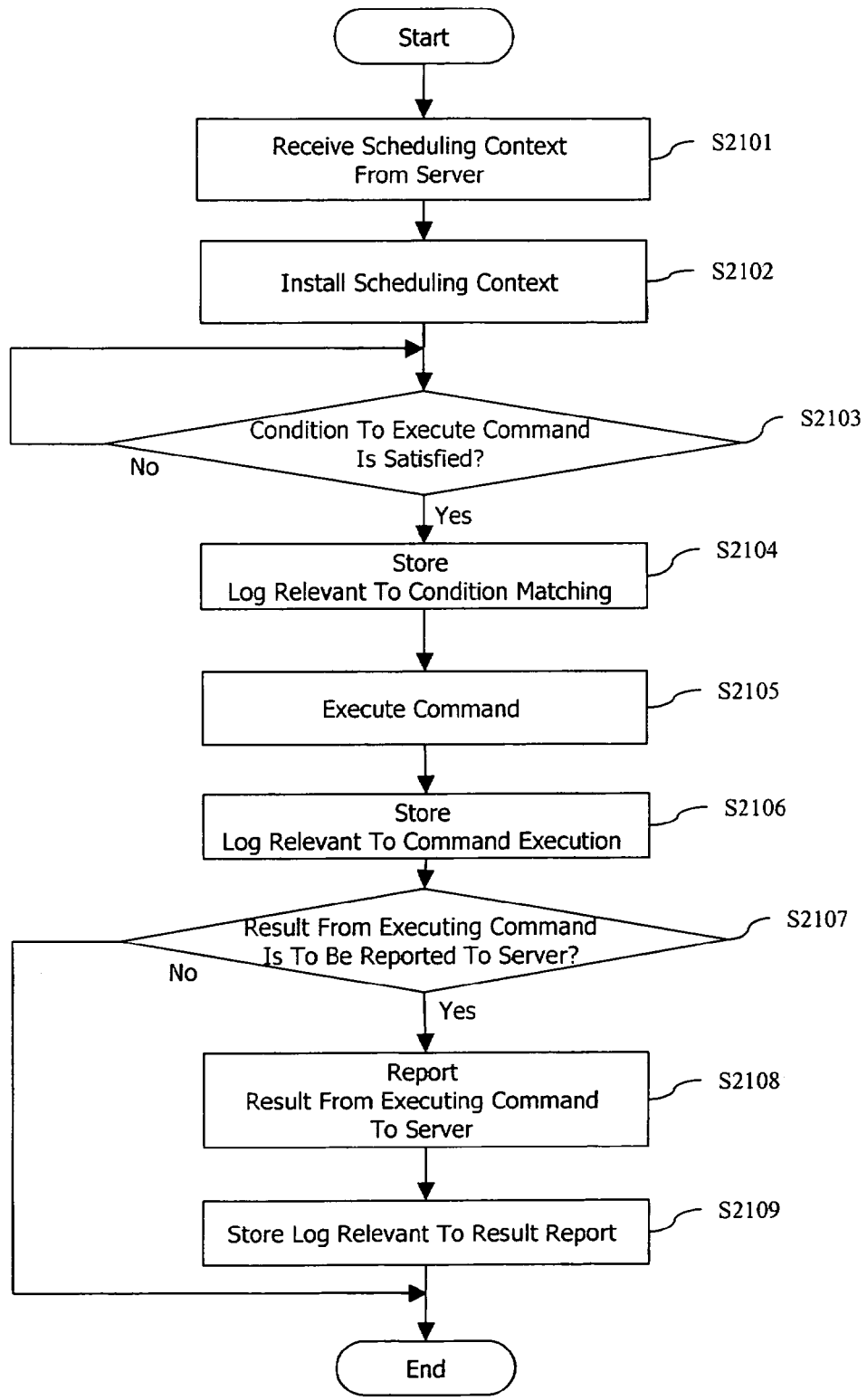
FIG. 11 shows a flowchart of an exemplary logging method according to one or more embodiments herein.

FIG. 11 is a flowchart showing a logging method according to another embodiment. When the status reporting module 216 does not transmit a status report to the DM server 100 due to an error (or for some other reason), the DM server 100 may incorrectly determine that the terminal 100 is in a normal state. In order to solve such problem, an exemplary logging (or recording) method is employed.

In more detail, the terminal 200 may receive a scheduling context from the DM server 200 (S2101), and such scheduling context may further include at least one of a gating rule and a logging rule. It is clear that other additional and/or alternative rules, regulations, instructions, and the like may also exist.

Upon receipt, the terminal 200 installs the scheduling context (S2102). This installation procedure refers to setting (or establishing) a command(s) and a condition(s) to execute the command(s) in the terminal 200 by using the scheduling context. Also, the gating rule and the logging rule included in the scheduling context may be set (or established) in the terminal 200.

When the setting (S2102) is completed, the terminal 200 monitors (or checks) whether a condition to execute the command is satisfied (or matched) (S2103).

If it is found that the condition to execute the command is satisfied (S2103), the terminal 200 may then store a log (or record) relevant to the condition matching in a storage unit 230 (such as a memory device) (S2104).

Thereafter, the terminal 200 executes the particular command (S2105).

When the command execution is completed (S2105) or when the command execution is not performed due to an error (or due to some other reason), the terminal 200 may store a log (or record) relevant to the command execution in the storage unit 230 (S2106).

The terminal 200 determines whether the result of executing the command should be reported to the DM server 100 (S2107). As aforementioned, the determination may be performed by using the gating rule (or some other appropriate rule or instruction) included in the scheduling context. If it is determined that the result from executing the command is to be reported, the terminal 200 transmits the result (e.g., in the form of a result report) to the DM server 100 (S2108).

When the result reporting is completed (S2108) or when the result reporting is not executed due to an error (or for some other reason), the terminal 200 may store a log (or record) relevant to the result report in the storage unit 230 (S2109).

The embodiments for the method for reporting information to a server and the logging (or recording) method described herein may be implemented using software, hardware or a combination thereof. For instance, the method may be implemented as codes or commands within a software program that can be stored in a storage medium (e.g., an internal memory of the mobile terminal, a Flash memory, a hard disc, etc.) and that can be executed by a processor (e.g., an internal micro processor, controller, etc. of the mobile terminal).

As a result of implementing at least some of the features in at least one of the embodiments described herein for achieving device management, the terminal may filter (i.e., sort out, categorize, select, etc.) certain command execution results and transmit such to the network (e.g., a DM server) instead of always sending all command execution results. Accordingly, resources of the terminal and radio (wireless) communication resources can be more efficiently utilized when compared to previously used device management procedures.

Furthermore, since a log (or some other record) relevant to operations performed within the terminal is stored (or otherwise saved in memory), even if a certain result of executing a particular command is not successfully transmitted to the network (e.g., a DM server) due to an error (or some other reason), the network (DM server) may still be able to certify (i.e., check, verify, etc.) the command execution result by accessing the log (or record) that was stored in the terminal.

The present specification provides a terminal comprising: a first module to search for a gating rule if a command for a device management is executed, and to determine whether a result from executing the command is reported to a server or gated-off according to the gating rule; and a second module to report to the server the result from executing the command determined to be reported, wherein the gating rule includes a first element to specify a reference number of the command to be gated-off and a second element to specify a response code to be gated-off.

Also, the present specification provides a server comprising: a first module to create a scheduling context and to request an installation of the created scheduling context to a terminal; and a second module to receive at least one of a result from executing a command for a device management and a status of the scheduling context from the terminal, and to parse at least one of the result and the status, wherein the scheduling context includes at least one of a first element to specify the command, a second element to specify a condition to execute the command, a third element to specify a reference number of the command included in the result to be gated-off and a response code included in the result to be gated-off, and a fourth element to specify whether or not the status of the scheduling context should be reported to the server.

Furthermore, the present specification provides a method for reporting information to a server by a terminal, comprising: searching for a gating rule which specifies whether a result from executing a command for a device management should be reported to a server or gated-off, if the command is executed; determining whether the result from executing the command is reported to the server or gated-off, according to the gating rule if the gating rule is found; and reporting the result determined to be reported to the server.

Furthermore, the present specification provides a method for reporting information to a server by a terminal, comprising: searching for a gating rule which specifies whether a result from executing a command for a device management should be reported or gated-off, if the command is executed; extracting a reference number of the command and a response code from the result from executing the command; comparing the extracted reference number with a reference number specified in the gating rule; and comparing the extracted response code with a response code specified in the gating rule; reporting the result to a server if the extracted reference number and the extracted response code are not matched with each condition according to the gating rule.

Certain aspects described herein are related particular standards (such as, OMA, GSM, 3GPP, 3GPP2, IEEE, etc.). As such, at least some of the features described herein are applicable to such standards that have been developed or that are continuing to evolve.

It should also be understood that the above-described embodiments are not limited by any of the details of the foregoing description, unless otherwise specified, but rather should be construed broadly. Any structural and/or functional changes and modifications that fall within the metes and bounds of the claims or equivalents of such metes and bounds are therefore intended to be embraced by such claims.

What is claimed is:

1. A mobile terminal, comprising:
a transceiver adapted to receive from a server a scheduling context including a plurality of commands for managing the mobile terminal, a plurality of conditions for executing the commands, and a plurality of gating rules, each gating rule corresponding to one of the plurality of commands and indicating whether a corresponding command result is to be reported to the server; and
a processor adapted to perform a process including
installing the scheduling context,
monitoring the plurality of conditions,
determining that one of the plurality of conditions is satisfied,
executing one of the plurality of commands corresponding to the satisfied condition,
determining, according to the gating rule, whether or not the corresponding command result is reported to the server, and
storing the corresponding command result if the gating rule indicates that the corresponding command result is to be reported to the server,
wherein the processor is adapted to repeat the process until the process is completed for each of the plurality of commands,
wherein, after the process is completed for each of the plurality of commands, the processor is further adapted to create and transmit a single report message via a radio communication, the single report message including all stored command results, wherein, when the transmission of the single report message fails, the processor is further adapted to log a history of the transmission failure to thereby be accessed by the server, wherein each result includes at least one of a first element identifying a result command reference number and a second element identifying a result command response code, and wherein the gating rule includes at least one of a third element identifying a gating rule command reference number and a fourth element identifying a gating rule command response code.

2. The mobile terminal of claim 1, wherein each to-be reported result includes a command kind field.

3. The mobile terminal of claim 1, wherein the processor is further adapted to compare the at least one of the first element and the second element from each result, with a corresponding one of the third and fourth elements to determine whether the corresponding result should be reported.

4. The mobile terminal of claim 1, wherein the processor is adapted to report at least one of a status, an event which has been occurred in the mobile terminal, and an error which has been occurred in the mobile terminal to the server.

5. The mobile terminal of claim 4,
wherein the scheduling context includes an event reporting rule specifying whether at least one of the status, the event, and the error should be reported to the server.

6. The mobile terminal of claim 1, wherein, for each of the plurality of commands, the processor is adapted to log a history relevant to at least one of
whether or not the condition corresponding to the command is satisfied,
whether or not an interaction with a user of the mobile terminal with regard to the command is performed,
whether or not the command is executed, and
whether or not the corresponding result is reported.

7. The mobile terminal of claim 6,
wherein the scheduling context includes a logging rule specifying at least one of whether the logging should be enabled or not, and information for a buffer in which logged data is stored.

8. A method for reporting information from a mobile terminal to a server, comprising:
receiving, by the mobile terminal from the server, a scheduling context including a plurality of commands for managing the mobile terminal, a plurality of conditions for executing the commands, and a plurality of gating rules, each gating rule corresponding to one of the plurality of commands and indicating whether a corresponding command result is to be reported to the server;
performing, by the mobile terminal, a process including
installing the scheduling context,
monitoring the plurality of conditions,
determining that one of the plurality of conditions is satisfied,
executing one of the plurality of commands corresponding to the satisfied condition,
determining, according to the gating rule, whether or not the corresponding command result is reported to the server, and
storing the corresponding command result if the gating rule indicates that the corresponding command result is to be reported to the server;
repeating the process by the mobile terminal until the process is completed for each of the plurality of commands;
after the process is completed for each of the plurality of commands, creating and transmitting a single report message from the mobile terminal to the server via a radio communication, the single report message including all stored command results; and
when the transmission of the single report message fails, logging a history of the transmission failure to thereby be accessed by the server,
wherein each result includes at least one of a first element identifying a result command reference number and a second element identifying a result command response code, and
wherein the gating rule includes at least one of a third element identifying a gating rule command reference number and a fourth element identifying a gating rule command response code.

9. The method of claim 8, wherein the single report message comprises:
at least one of a status of the mobile terminal, an event which has been occurred in the mobile terminal, and an error which has been occurred in the mobile terminal.

10. The method of claim 8, further comprising:
for each of the plurality of commands, logging a history relevant to at least one of
whether or not the condition corresponding to the command is satisfied,
whether or not an interaction with a user of the mobile terminal about executing the command is performed,
whether or not the command is executed, and
whether or not a corresponding result has been reported.

11. The method of claim 8, further comprising:
comparing the at least one of the first element and the second element from each result, with a corresponding one of the third and fourth elements to determine whether the corresponding result should be reported.

* * * * *